United States Patent
Wolfner et al.

(10) Patent No.: US 10,944,583 B2
(45) Date of Patent: Mar. 9, 2021

(54) PROXIMITY SERVICES PRIORITY CONTROL FOR MULTICAST TRAFFIC IN PROXIMITY SERVICES USER EQUIPMENT-NETWORK RELAY SCENARIO

(71) Applicant: NOKIA SOLUTIONS AND NETWORKS OY, Espoo (FI)

(72) Inventors: Gyorgy Tamas Wolfner, Budapest (HU); Xiang Xu, Jiangsu (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/740,397

(22) PCT Filed: Jun. 30, 2016

(86) PCT No.: PCT/EP2016/065344
§ 371 (c)(1),
(2) Date: Dec. 28, 2017

(87) PCT Pub. No.: WO2017/001581
PCT Pub. Date: Jan. 5, 2017

(65) Prior Publication Data
US 2018/0191516 A1    Jul. 5, 2018

Related U.S. Application Data

(60) Provisional application No. 62/186,856, filed on Jun. 30, 2015.

(51) Int. Cl.
*H04L 12/18* (2006.01)
*H04W 76/14* (2018.01)
(Continued)

(52) U.S. Cl.
CPC ........... *H04L 12/189* (2013.01); *H04W 8/005* (2013.01); *H04W 76/14* (2018.02); *H04W 88/04* (2013.01); *H04W 84/047* (2013.01)

(58) Field of Classification Search
CPC combination set(s) only.
See application file for complete search history.

(56) References Cited

U.S. PATENT DOCUMENTS

| 6,108,307 A | 8/2000 | McConnell et al. |
| 8,483,123 B2 | 7/2013 | Zheng et al. |

(Continued)

FOREIGN PATENT DOCUMENTS

| CN | 1431811 A | 7/2003 |
| CN | 101141171 A | 3/2008 |

(Continued)

OTHER PUBLICATIONS

International Search Report & Written Opinion dated Oct. 19, 2016 corresponding to International Patent Application No. PCT/EP2016/065344.

(Continued)

*Primary Examiner* — Hong S Cho
(74) *Attorney, Agent, or Firm* — Squire Patton Boggs (US) LLP

(57) ABSTRACT

Various communication systems may benefit from proper priority control. For example, communication devices in a proximity services user equipment to network relay scenario may benefit from proximity services priority control for multicast traffic. A method can include receiving, at a relay user equipment, an indication of proximity services priority from a remote user equipment. The method can also include applying, by the relay user equipment, a priority based on the indication received from the remote user equipment.

19 Claims, 4 Drawing Sheets

(51) Int. Cl.
*H04W 88/04* (2009.01)
*H04W 8/00* (2009.01)
*H04W 84/04* (2009.01)

(56) References Cited

U.S. PATENT DOCUMENTS

| | | | |
|---|---|---|---|
| 9,059,771 | B2 | 6/2015 | Shiizaki et al. |
| 2003/0128708 | A1 | 7/2003 | Inoue et al. |
| 2014/0307618 | A1 | 10/2014 | Kim et al. |
| 2015/0036578 | A1* | 2/2015 | Wu .................... H04L 12/189 370/312 |
| 2015/0029866 | A1 | 6/2015 | Liao et al. |
| 2016/0285934 | A1* | 9/2016 | Cheng ................ H04L 65/4076 |
| 2016/0286590 | A1* | 9/2016 | Cheng .................... H04W 4/90 |
| 2016/0381491 | A1* | 12/2016 | Watfa .................. H04W 4/023 455/41.2 |
| 2016/0381523 | A1* | 12/2016 | Baghel ................ H04W 52/46 370/315 |

FOREIGN PATENT DOCUMENTS

| | | |
|---|---|---|
| CN | 101668314 A | 3/2010 |
| CN | 101883386 A | 11/2010 |
| CN | 102625366 A | 8/2012 |
| CN | 103858362 A | 6/2014 |
| CN | 104039020 A | 9/2014 |
| WO | WO 2015/004142 A1 | 1/2015 |
| WO | 2015/017188 A1 | 2/2015 |

OTHER PUBLICATIONS

3GPP TR 23.713 V1.0.0 (Feb. 2015), Technical Report, 3rd Generation Partnership Project; Technical Specification Group Services and System Aspects; Study on extended architecture support for proximity-based services (Release 13), 3GPP Draft; Mar. 4, 2015, XP050961131.

3GPP TS 23.303 V13.1.0 (Sep. 2015), Technical Specification, 3rd Generation Partnership Project; Technical Specification Group Services and System Aspects; Proximity-based services (ProSe); Stage 2 (Release 13), 3GPP Draft; Sep. 17, 2015, XP051071776.

European Office Action corresponding to Appln. No. 16 742 173.4, dated Jan. 28, 2019.

Korean Office Action corresponding to Appln. No. 10-2018-7002658, dated Jun. 14, 2019.

3GPP TR 23.713 V1.4.0 (Jun. 2015), 3rd Generation Partnership Project; Technical Specification Group Services and System Aspects; Study on extended architecture support for proximity-based services (Release 13); 85 pages.

Communication pursuant to Article 94(3) EPC corresponding to European Appln. No. 16 742 173.4, dated Jun. 7, 2019.

Chinese Office Action corresponding to CN Appln. No. 201680050190.5, dated Apr. 17, 2020.

Second Office Action dated Jan. 4, 2021 corresponding to Chinese Patent Application No. 201680050190.5, with English Summary of the Office Action.

\* cited by examiner

PROXIMITY SERVICES PRIORITY CONTROL FOR MULTICAST TRAFFIC IN PROXIMITY SERVICES USER EQUIPMENT-NETWORK RELAY SCENARIO

CROSS-REFERENCE TO RELATED APPLICATION

This application is related to and claims the benefit and priority of U.S. Provisional Patent Application No. 62/186,856, filed Jun. 30, 2015, the entirety of which is hereby incorporated herein by reference.

BACKGROUND

Field

Various communication systems may benefit from proper priority control. For example, communication devices in a proximity services user equipment to network relay scenario may benefit from proximity services priority control for multicast traffic.

Description of the Related Art

Third generation partnership project (3GPP) is working on proximity services (ProSe), which may permit the use long term evolution (LTE) radio directly between the devices without involving the network. In 3GPP release 12 (Rel-12) a set of ProSe features were specified, which may be enhanced in 3GPP release 13 (Rel-13). The core network architecture is illustrated in 3GPP technical specification (TS) 23.303, while a feasibility study for Rel-13 enhancements can be seen in 3GPP technical report (TR) 23.713. 3GPP TS 23.303 and 3GPP TR 23.713 are hereby incorporated herein by reference in their entirety.

Amongst the enhancements of Rel-13 enhancements, there is consideration of support of ProSe user equipment (UE)-to-network (NW) relay and consideration of support of ProSe priorities during ProSe direct communication.

ProSe UE-to-NW relay can refer to a scenario in which a UE that is in-coverage of the network and has a network connection can provide network connectivity as a relay UE. This connectivity can be provided via ProSe direct communication over a PC5 interface for other UEs that are outside network coverage. These out-of-coverage UEs can be referred to as remote UEs.

A high level architecture is depicted in FIG. 1, which is shown as FIG. 7.2.1.2.1 of section 7.2 of 3GPP TR 23.713. As shown in FIG. 1, a remote UE can be connected to a ProSE UE-to-Network Relay over interface PC5. The ProSE UE-to-Network Relay can be connected to an evolved Node B (eNB) over interface Uu. The eNB can connect to an evolved packet core (EPC). A Public Safety application server (AS) can connect to the EPC over interface SGi. Other elements can also be included, although these elements are shown for purposes of illustration.

Unicast and multicast communication may be supported in the relay scenario. In the multicast solution, the relay UE can listen to eMBMS on behalf of the remote UEs. When the relay UE receives traffic over eMBMS, it can forward the traffic using ProSe one-to-many direct communication towards the remote UEs.

FIG. 2 illustrates a temporary mobile group identifier (TMGI) monitoring request mechanism, which is shown as FIG. 7.2.2.2.1 of 3GPP TR 23.713. As shown in FIG. 2, the illustrated procedure can begin at 1 with a UE successfully discovering a relay and the application server has provided user service description (USD) to the UE so the UE can listen to related broadcast content if available in the cell.

At 2, the remote UE can send a TMGI monitoring request to the relay UE. The request can include both a particular TMGI and one or more related multimedia broadcast-multicast services (MBMS) service area identifiers (SAIs).

At 3, the one of the requested MBMS SAIs can be detected by the relay UE in coordination with the network. Thus, at 4, the relay UE can send a TMGI monitoring response to the remote UE. The response can include parameters such as ProSe Layer-2 Group ID_traffic and a TMGI monitoring refresh timer.

At 5, TMGI can be detected by the relay UE in coordination with the network. At 6, the relay UE can provide a TMGI announcement to the remote UE. Then, at 7, the UE can receive broadcast content and may release a unicast distribution leg.

Accordingly, after successful establishment of the unicast communication between the relay UE and the remote UE, the remote UE can receives the information about MBMS information from the application server using unicast communication. Then the remote UE can request the relay UE to listen to the MBMS traffic of its group, and can forward the necessary MBMS parameters to the relay UE. Based on this information, the relay UE can start listening to MBMS and if the relay UE receives MBMS data, then the relay UE can forward the data to the Remote UEs of that group using ProSe direct communication. More details of the procedure can be found in section 7.2.2 of 3GPP TR 23.713.

ProSe per packet priorities may be specified over a PC5 interface, which can refer to the interface between ProSe UEs to be used for ProSe direct communication, as illustrated in FIG. 1. Priority of ProSe communication transmission can be determined by the application for each packet, instead of being controlled by the network. This priority may change during the communication. Priority queues within the UEs, both intra-UE and inter-UE where possible, can be served in priority order. More details on ProSe priorities can be found in section 7.5.1 of 3GPP TR 23.713.

There is conventionally no way for the Relay UE to set the priority over PC5 for packets received over MBMS. Mapping of quality of service (Qos) class identifier (QCI), or other QoS parameters, of the MBMS bearer to ProSe priority may not be possible, as the relay UE may not be aware of the QoS parameters of the MBMS bearer. According to the conventional specifications, the relay UE may have no application level connection the group application server. Thus, conventionally the relay UE may not be able to get any information directly from the group application server. In addition, the relay UE may not be an eNB, and so may not be able to get the priority information from the mobility management entity (MME) or other core network (CN) entities.

SUMMARY

According to a first embodiment, a method can include receiving, at a relay user equipment, an indication of proximity services priority from a remote user equipment. The method can also include applying, by the relay user equipment, a priority based on the indication received from the remote user equipment.

In a variant, the indication can be received when the remote user equipment requests temporary mobile group identity monitoring.

In a variant, the indication can be received over a PC5 interface.

In a variant, the applying the priority can include applying the priority over the PC5 interface.

In a variant, the applying the priority can include applying the priority when forwarding packets received over a multimedia broadcast-multicast services bearer.

In a variant, the indication can be configured to provide a MBMS bearer specific priority value.

In a variant, the method can further include storing, by the relay user equipment, a value based on the indication on a per-multimedia broadcast-multicast services bearer basis.

In a variant, the relay user equipment can be configured to store at least one value for each multimedia broadcast-multicast services bearer that the relay user equipment is configured to monitor.

In a variant, the method can further include updating, by the relay user equipment, the priority based on a subsequently received indication.

In a variant, the updating can be configured to occur during the lifetime of a session in which the priority was applied based on the indication.

In a variant, the relay user equipment can be configured always to use a latest received priority value.

In a variant, the subsequently received indication can be received in a new monitoring request.

In a variant, the new monitoring request can have a new priority value.

In a variant, the priority can be updated from normal communication to emergency communication.

In a variant, the remote user equipment can be a member of a group of user equipment and wherein the priority relates to messages for the group.

According to a second embodiment, a method can include determining a proximity services priority to be applied to communications between a remote user equipment and a relay user equipment. The method can also include transmitting, from the remote user equipment to the relay user equipment, an indication of the proximity services priority. The indication can be configured to be applied by the relay user equipment to the communications between the remote user equipment and the relay user equipment.

In a variant, the indication can be transmitted when the remote user equipment requests temporary mobile group identity monitoring.

In a variant, the indication can be transmitted over a PC5 interface.

In a variant, the priority can be applied over a PC5 interface.

In a variant, the indication can be configured to provide a MBMS bearer specific priority value.

In a variant, the method can include updating, by the remote user equipment, the priority. The method can also include transmitting a subsequent indication based on the priority as updated.

In a variant, the updating can be configured to occur during the lifetime of a session in which the priority was determined.

In a variant, the subsequent indication can be transmitted in a new monitoring request.

In a variant, the new monitoring request can have a new priority value.

In a variant, the priority can be updated from normal communication to emergency communication.

In a variant, the remote user equipment can be a member of a group of user equipment and the priority can relate to messages for the group.

In a variant, the method can include learning, by the remote user equipment, of a need to change priority via application level signaling from a group application server. The updating can be based on the learning.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Certain embodiments provide that a relay user equipment (UE) can receive a proximity services (ProSe) priority to be used over a PC5 interface. This can be received from the remote UE when the remote UE requests TMGI monitoring, for example at step 2 in FIG. 2. The relay UE can be configured always to use the received priority value over PC5 when the relay UE forwards packets received over an MBMS bearer. The priority values can be MBMS bearer specific and thus the relay UE can store the priority value for each MBMS bearer that the relay UE monitors.

As the priority can change during the lifetime of the session, the remote UE may be able to update the priority. An example of such a change of priority may be normal communication initially, followed by emergency communication, or vice versa. The priority here can refer to priority for group communication.

The remote UE can learn when there is a need to change the priority via application level signaling received from a group application server. The remote UE can then send a new monitoring request with a new priority value. The relay UE can then use the latest received priority value.

The relay UE may get multiple monitoring requests for the same MBMS bearer, as all remote UEs of the group may send the request individually, and the relay UE may be providing relay for more than one member of the group. If the relay UE applies the latest priority value for the MBMS bearer, the relay UE can apply this priority value even to communication with group members other than the particular remote UE that most recently sent the request with the new priority indication.

Figure 3:
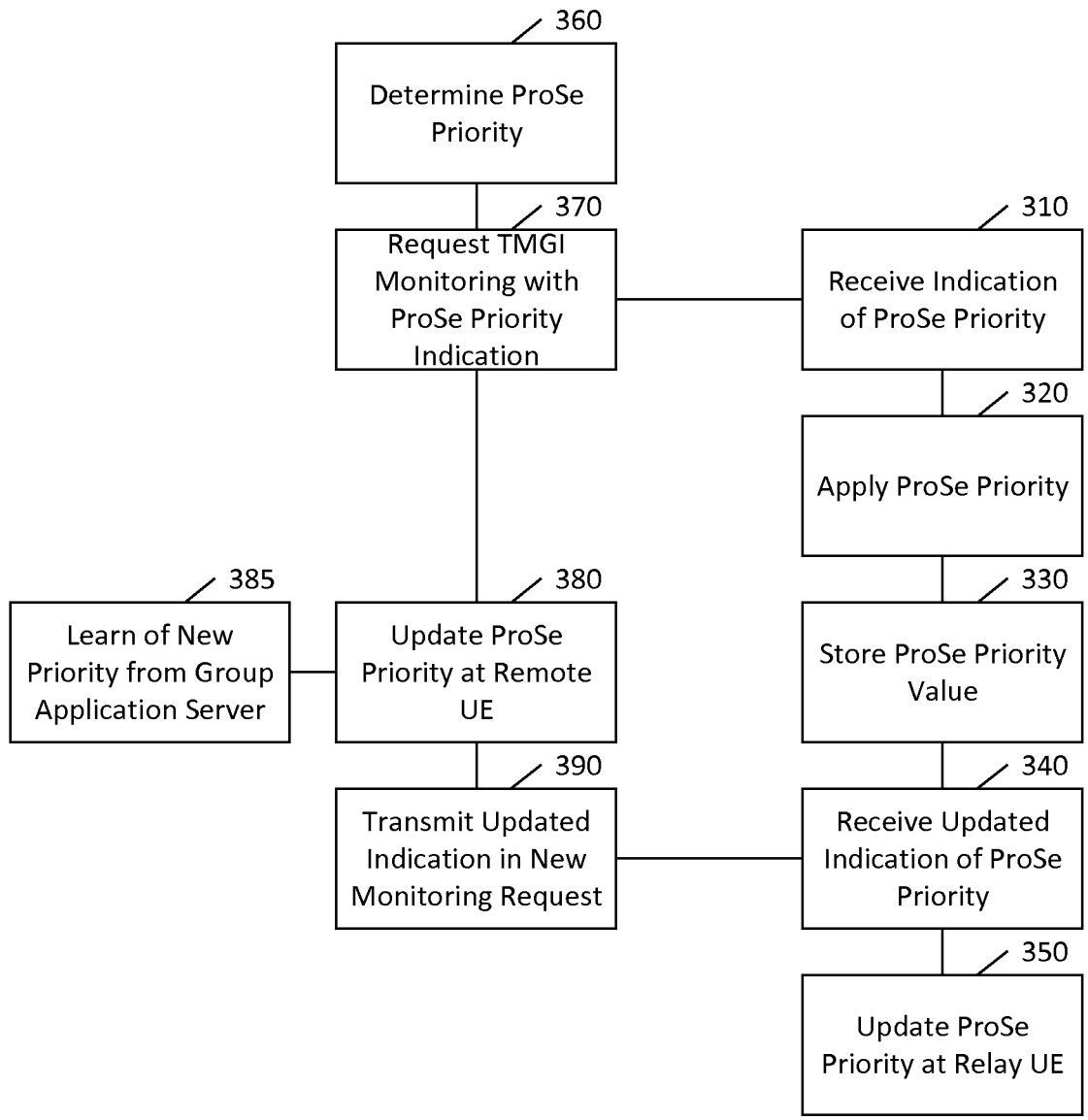
FIG. 3 illustrates a method according to certain embodiments.

FIG. 3 illustrates a method according to certain embodiments. As shown in FIG. 3, a method can include, at 310, receiving, at a relay user equipment, an indication of proximity services priority from a remote user equipment. The indication can be received when the remote user equipment requests temporary mobile group identity monitoring at 370. The indication can be sent from the remote UE and received by the relay UE over a PC5 interface. The indication can be configured to provide a MBMS bearer specific priority value.

The method can also include, at 320, applying, by the relay user equipment, a priority based on the indication received from the remote user equipment. The applying the priority can include applying the priority over the PC5 interface. The applying the priority can include applying the priority when forwarding packets received over a multimedia broadcast-multicast services bearer.

The method can further include, at 330, storing, by the relay user equipment, a value based on the indication on a per-multimedia broadcast-multicast services bearer basis. The value may be the indication itself or some value derived from the indication. The relay user equipment can be configured to store at least one value for each multimedia broadcast-multicast services bearer that the relay user equipment is configured to monitor.

The method can also include, at 350, updating, by the relay user equipment, the priority based on a subsequently received indication, which can be received at 340, for example in a new monitoring request. The new monitoring request can have a new priority value that is different from the originally received value, or it may be the same as previously received. The new value can be indicated in absolute terms, or in relative terms, relative to the previous priority indication.

The updating can be configured to occur during the lifetime of a session in which the priority was applied at 320 based on the indication. The relay user equipment can be configured always to use a latest received priority value. The priority can be updated from normal communication to emergency communication or vice versa. Other priorities are also permitted.

The remote user equipment can be a member of a group of user equipment. Additionally, the priority can relate to messages for the group.

The features from 310 to 350 may be performed by, for example, a relay device, such as a relay user equipment. There can be additional method features performed by a remote user equipment.

At 360, the method can include determining a proximity services priority to be applied to communications between a remote user equipment and a relay user equipment. The method can also include, at 370, transmitting, from the remote user equipment to the relay user equipment, an indication of the proximity services priority. The indication can be configured to be applied by the relay user equipment to the communications between the remote user equipment and the relay user equipment. The indication can be transmitted when the remote user equipment requests temporary mobile group identity monitoring. As mentioned above, the indication can be configured to provide a group-specific priority value.

The method can also include, at 380, updating, by the remote user equipment, the priority. The method can further include, at 390, transmitting a subsequent indication based on the priority as updated. The updating can be configured to occur during the lifetime of a session in which the priority was determined. The subsequent indication can be transmitted in a new monitoring request. The new monitoring request can have a new priority value. The priority can be updated from normal communication to emergency communication, or vice versa, as mentioned above.

The method can also include, at 385, learning, by the remote user equipment, of a need to change priority via application level signaling from a group application server. The updating by the remote user equipment can be based on the learning.

Figure 4:
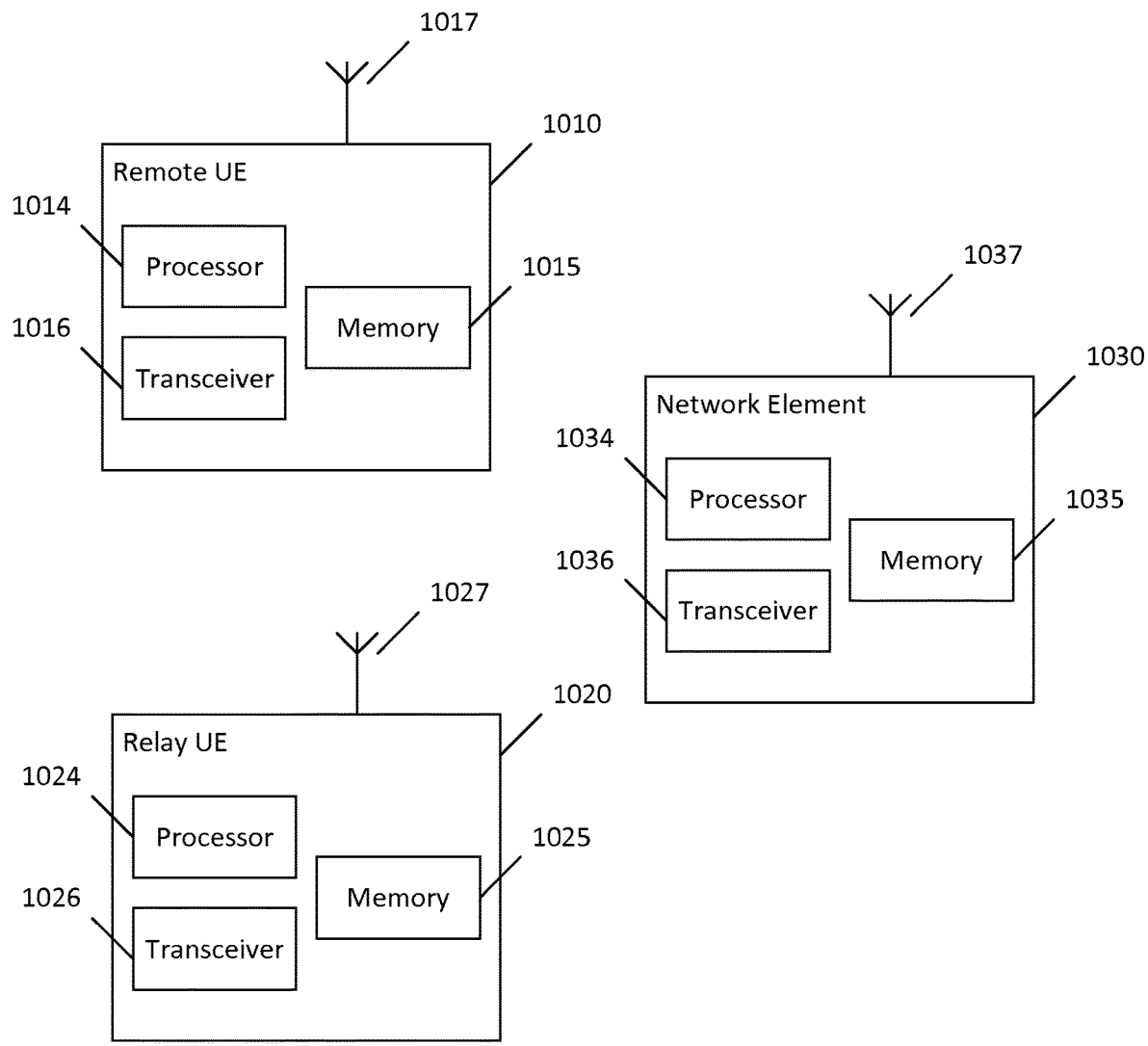
FIG. 4 illustrates a system according to certain embodiments.

FIG. 4 illustrates a system according to certain embodiments of the invention. In one embodiment, a system may include multiple devices, such as, for example, at least one remote UE 410, at least one relay UE 420, and at least one other network element 430, which may be an eNB or other radio access network element, a mobility management entity, group application server, or other core network element.

Each of these devices may include at least one processor, respectively indicated as 414, 424, and 434. At least one memory can be provided in each device, and indicated as 415, 425, and 435, respectively. The memory may include computer program instructions or computer code contained therein. The processors 414, 424, and 434 and memories 415, 425, and 435, or a subset thereof, can be configured to provide means corresponding to the various blocks of FIG. 3.

As shown in FIG. 4, transceivers 416, 426, and 436 can be provided, and each device may also include an antenna, respectively illustrated as 417, 427, and 437. Other configurations of these devices, for example, may be provided. For example, network element 430 may be configured for wired communication, in addition to or instead of wireless communication, and in such cases antenna 437 can illustrate any form of communication hardware, without requiring a conventional antenna.

Transceivers 416, 426, and 436 can each, independently, be a transmitter, a receiver, or both a transmitter and a receiver, or a unit or device that is configured both for transmission and reception.

Processors 414, 424, and 434 can be embodied by any computational or data processing device, such as a central processing unit (CPU), application specific integrated circuit (ASIC), or comparable device. The processors can be implemented as a single controller, or a plurality of controllers or processors.

Memories 415, 425, and 435 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as remote UE 410, relay UE 420, and network element 430, to perform any of the processes described herein (see, for example, FIG. 3). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Figure 1:
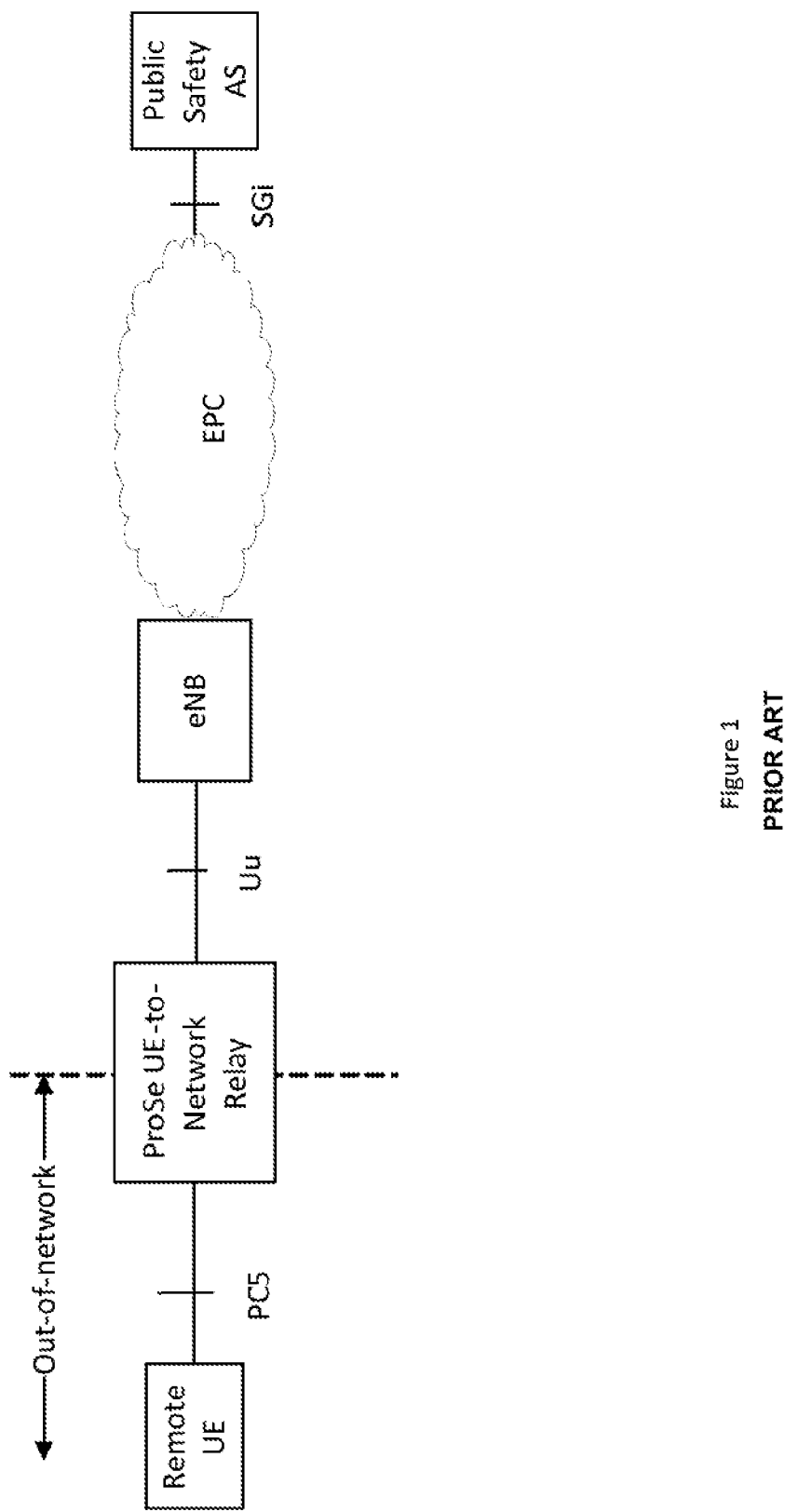
FIG. 1 illustrates a high level architecture.
Figure 2:
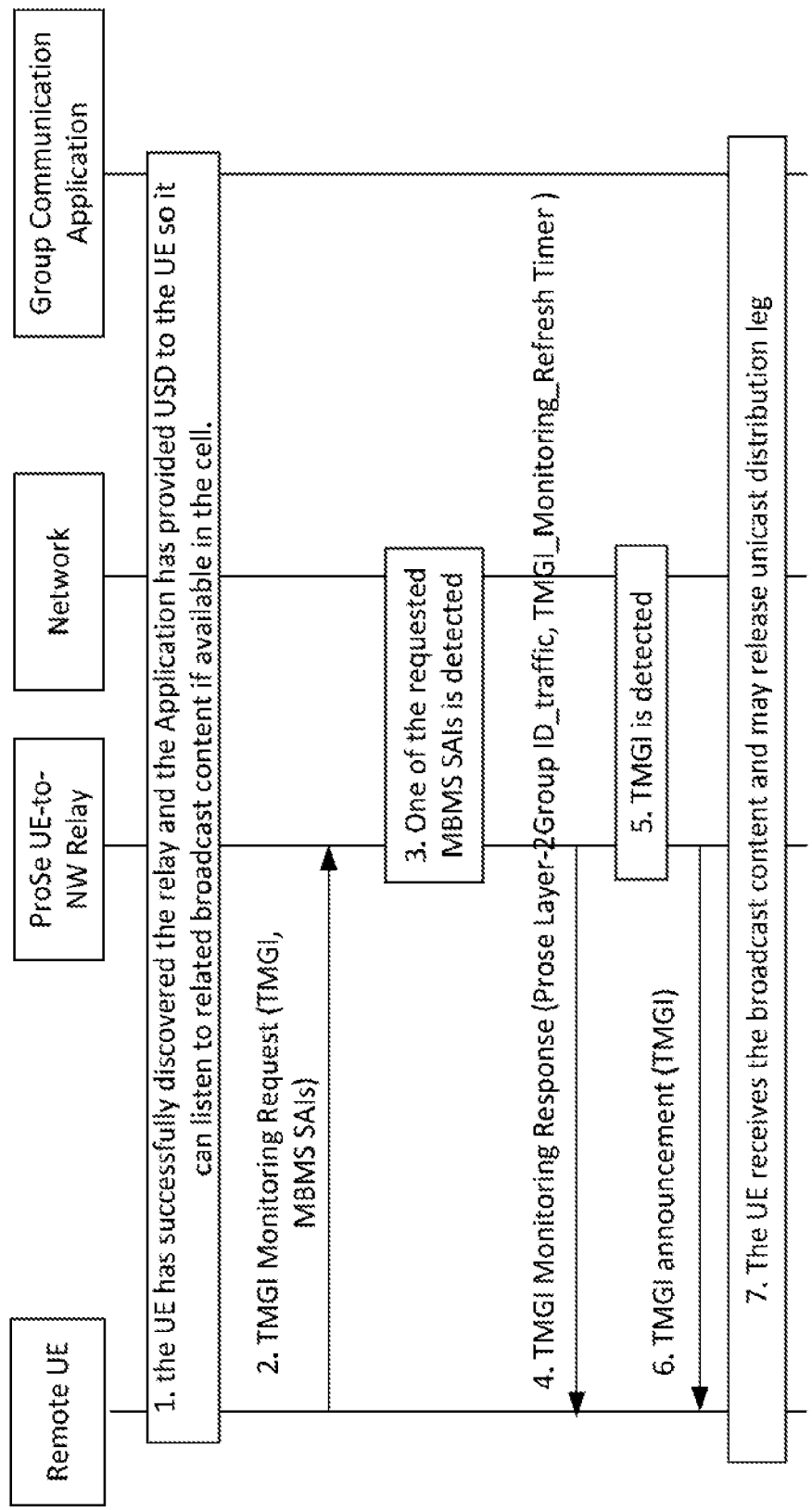
FIG. 2 illustrates a temporary mobile group identifier (TMGI) monitoring request mechanism.

Furthermore, although FIG. 4 illustrates a system including a remote UE, relay UE, and network element, embodiments of the invention may be applicable to other configurations, and configurations involving additional elements. For example, not shown, additional UEs may be present, and additional core network elements may be present, as illustrated in FIGS. 1 and 2.

Certain embodiments may have various benefits and/or advantages. For example, certain embodiments may be able to be implemented by an additional parameter in a message that can be used for other purposes as well. Moreover, certain embodiments can provide flexibility to an application to set priority and to modify priority at any point.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   receiving, at a relay user equipment, an indication of proximity services priority from a remote user equipment, wherein the indication is received over a PC5 interface; and
   applying, by the relay user equipment, a priority based on the indication received from the remote user equipment, and
   wherein the relay user equipment is configured to store at least one value for each multimedia broadcast-multicast services bearer that the relay user equipment is configured to monitor.

2. The method of claim 1, wherein the indication is received when the remote user equipment requests temporary mobile group identity monitoring.

3. The method of claim 1, wherein the applying the priority comprises applying the priority over a PC5 interface.

4. The method of claim 1, wherein the applying the priority comprises applying the priority when forwarding packets received over a multimedia broadcast-multicast services bearer.

5. The method of claim 1, wherein the indication is configured to provide a multimedia broadcast-multicast services bearer specific priority value.

6. The method of claim 1, further comprising:
   storing, by the relay user equipment, a value based on the indication on a per-multimedia broadcast-multicast services bearer basis.

7. The method of claim 1, further comprising:
   updating, by the relay user equipment, the priority based on a subsequently received indication.

8. The method of claim 7, wherein the updating is configured to occur during the lifetime of a session in which the priority was applied based on the indication.

9. The method of claim 7, wherein the relay user equipment is configured always to use a latest received priority value.

10. The method of claim 7, wherein the subsequently received indication is received in a new monitoring request.

11. The method of claim 1, wherein the remote user equipment is a member of a group of user equipment, and wherein the priority relates to messages for the group.

12. A method, comprising:
    determining a proximity services priority to be applied to communications between a remote user equipment and a relay user equipment; and
    transmitting, from the remote user equipment to the relay user equipment, an indication of the proximity services priority,
    wherein the indication is transmitted over a PC5 interface,
    wherein the indication is configured to be applied by the relay user equipment to the communications between the remote user equipment and the relay user equipment, and
    wherein the indication is configured to provide a multimedia broadcast-multicast services bearer specific priority value.

13. The method of claim 12, wherein the indication is transmitted when the remote user equipment requests temporary mobile group identity monitoring.

14. The method of claim 12, wherein the priority is applied over a PC5 interface.

15. The method of claim 12, further comprising:
    updating, by the remote user equipment, the priority; and
    transmitting a subsequent indication based on the priority as updated.

16. The method of claim 12, wherein the remote user equipment is a member of a group of user equipment and the priority relates to messages for the group.

17. The method of claim 16, further comprising:
    learning, by the remote user equipment, of a need to change priority via application level signaling from a group application server, wherein the updating is based on the learning.

18. An apparatus, comprising:
    at least one processor; and
    at least one memory and computer program code,
    wherein the at least one memory and the computer program code are configured to, with the at least one processor, cause the apparatus at least to perform the method according to claim 1.

19. An apparatus, comprising:
    at least one processor; and
    at least one memory and computer program code,
    wherein the at least one memory and the computer program code are configured to, with the at least one processor, cause the apparatus at least to perform the method according to claim 12.

* * * * *